(12) United States Patent
Kuo (10) Patent No.: US 10,042,463 B2
(45) Date of Patent: Aug. 7, 2018

(54) TOUCH SENSING CIRCUIT AND A SIGNAL DEMODULATING METHOD

(71) Applicant: Novatek Microelectronics Corp., Hsinchu (TW)

(72) Inventor: Hung-Cheng Kuo, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 10 days.

(21) Appl. No.: 15/009,753

(22) Filed: Jan. 28, 2016

(65) Prior Publication Data
US 2017/0220177 A1 Aug. 3, 2017

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0418* (2013.01)

(58) Field of Classification Search
USPC .................................................. 345/173–174
See application file for complete search history.

(56) References Cited

U.S. PATENT DOCUMENTS

| | | | | |
|---|---|---|---|---|
| 8,416,213 B2* | 4/2013 | Shen | ...................... | G06F 3/0414 178/18.05 |
| 2010/0026527 A1 | 2/2010 | Nishimura et al. | | |
| 2011/0061947 A1* | 3/2011 | Krah | ...................... | G06F 1/3215 178/18.01 |
| 2011/0157072 A1 | 6/2011 | Chang | | |
| 2013/0162595 A1* | 6/2013 | Lee | ........................ | G06F 3/0418 345/174 |
| 2014/0240278 A1* | 8/2014 | Kim | ......................... | G06F 3/044 345/174 |
| 2014/0320449 A1 | 10/2014 | Park et al. | | |
| 2014/0347310 A1* | 11/2014 | Hargreaves | .............. | G06F 3/044 345/174 |
| 2015/0286335 A1* | 10/2015 | Haga | ...................... | G06F 3/0418 345/174 |
| 2016/0077634 A1* | 3/2016 | Guedon | ................. | G06F 3/0416 345/174 |
| 2018/0062508 A1* | 3/2018 | Yao | ........................ | G06F 1/3262 |

OTHER PUBLICATIONS

"Office Action of Taiwan Counterpart Application", dated Nov. 2, 2016, p. 1-p. 8.

* cited by examiner

*Primary Examiner* — Roy P Rabindranath
(74) *Attorney, Agent, or Firm* — JCIPRNET (57) ABSTRACT

A touch sensing circuit including a plurality of touch sensing channels is provided. Each of the touch sensing channels includes at least one operational amplifier circuit and a demodulating circuit. The operational amplifier circuit is configured to receive a touch sensing signal, and amplify the touch sensing signal. The operational amplifier circuit includes an operational amplifier. The operational amplifier has an inverting end, and the inverting end is coupled to a direct-current voltage. The demodulating circuit is coupled to the operational amplifier circuit. The demodulating circuit is configured to demodulate the amplified touch sensing signal by mixing the amplified touch sensing signal with a demodulating signal. A waveform of the demodulating signal includes a flat region. In addition, a signal demodulating method is also provided.

12 Claims, 9 Drawing Sheets

TOUCH SENSING CIRCUIT AND A SIGNAL DEMODULATING METHOD

BACKGROUND OF THE INVENTION

1. Field of the Invention

The invention generally relates to an electrical circuit and a signal processing method, in particular, to a touch sensing circuit and a signal demodulating method.

2. Description of Related Art

As the technology of touch panel develops, touch panels become widely used as the screens of electronic devices, such as mobile phones, laptop computers, and tablet computers. Touch panels allow the user to input or operate the electronic devices more conveniently and make the interface more user-friendly and convenient.

Generally speaking, the electrode structure of a capacitive touch panel includes multiple scanning electrodes and multiple sensing electrodes. In terms of actual application, the scanning electrodes are used to receive the driving signals inputted by a panel controller/driver, so as to drive the touch panel to sense the touch of the user. The sensing electrodes are used to generate touch sensing signals corresponding to the user's touch. In the conventional technology, AFE (analog front-end) hardware modules are used as interface sensors of many kinds to digital systems, providing hardware modularity. For touch sensing circuits, AFE circuits are also configured to compensate the touch sensing signals by using a compensation capacitor. However, the compensation capacitor may occupy large circuit area, so as to increase manufacturing costs. In addition, the touch sensing circuit demodulates the touch sensing signals with a sine wave signal. Accordingly, a high-bit multiplier for signal demodulation is necessary, thereby increasing the complexity of the touch sensing circuit, and reducing circuit performance.

Hence, how to design a touch sensing circuit that has simplified circuit structure and satisfactory circuit performance without increasing the manufacturing costs is one of the most important topics in the pertinent field.

SUMMARY OF THE INVENTION

Accordingly, the invention is directed to a touch sensing circuit and a signal demodulating method, capable of simplifying circuit structure and enhancing circuit performance.

The invention provides a touch sensing circuit includes a plurality of touch sensing channels. Each of the touch sensing channels includes at least one operational amplifier circuit and a demodulating circuit. The operational amplifier circuit is configured to receive a touch sensing signal, and amplify the touch sensing signal. The operational amplifier circuit includes an operational amplifier. The operational amplifier has an inverting end, and the inverting end is coupled to a direct-current voltage. The demodulating circuit is coupled to the operational amplifier circuit. The demodulating circuit is configured to demodulate the amplified touch sensing signal by mixing the amplified touch sensing signal with a demodulating signal. A waveform of the demodulating signal includes a flat region.

In an exemplary embodiment of the invention, the at least one operational amplifier circuit includes a plurality of operational amplifier circuits. Each of the touch sensing channels includes a multiplexer circuit. The multiplexer circuit is coupled between the operational amplifier circuits and the demodulating circuit. The multiplexer circuit is configured to sequentially select one of the operational amplifier circuits, and pass the amplified touch sensing signal to the demodulating circuit.

In an exemplary embodiment of the invention, the unselected operational amplifier circuits are disabled to stop working.

In an exemplary embodiment of the invention, the amplified touch sensing signal is a periodical signal having a period. The demodulating circuit demodulates the amplified touch sensing signal to extract a carrier signal from the amplified touch sensing signal during a part time interval of the period.

In an exemplary embodiment of the invention, the operational amplifier further has a non-inverting end and an output end. The non-inverting end is coupled to a ground voltage. The operational amplifier circuit further includes an impedance device. The impedance device is coupled between the inverting end and the output end.

In an exemplary embodiment of the invention, the demodulating circuit includes a mixer circuit, a filter circuit and a gain amplifier circuit. The mixer circuit is coupled to at least one operational amplifier circuit. The mixer circuit is configured to receive and mix the amplified touch sensing signal and the demodulating signal to generate the demodulated touch sensing signal. The filter circuit is coupled to the mixer circuit. The filter circuit is configured to receive the demodulated touch sensing signal, and reduce noise of the demodulated touch sensing signal. The gain amplifier circuit is coupled to the filter circuit. The gain amplifier circuit is configured to receive and amplify the demodulated touch sensing signal that the noise is reduced.

In an exemplary embodiment of the invention, the demodulating circuit further includes an analog-to-digital converter circuit. The analog-to-digital converter circuit is coupled to the mixer circuit and located before the mixer circuit or after the mixer circuit. The analog-to-digital converter circuit is configured to convert the touch sensing signal of an analog format to the touch sensing signal of a digital format.

The invention provides a signal demodulating method adapted to a touch sensing circuit. The signal demodulating method includes: receiving at least one touch sensing signal, and amplify the touch sensing signal by compensating the received at least one touch sensing signal via a direct-current voltage; and demodulating the amplified touch sensing signal by mixing the amplified touch sensing signal with a demodulating signal. A waveform of the demodulating signal includes a flat region.

In an exemplary embodiment of the invention, the at least one touch sensing signal includes a plurality of touch sensing signals. The signal demodulating method further includes: sequentially selecting one of the amplified touch sensing signals to be demodulated.

In an exemplary embodiment of the invention, the amplified touch sensing signal is a periodical signal having a period. In the step of demodulating the amplified touch sensing signal by mixing the amplified touch sensing signal with the demodulating signal, the amplified touch sensing signal is demodulated to extract a carrier signal from the amplified touch sensing signal during a part time interval of the period.

In an exemplary embodiment of the invention, the step of demodulating the amplified touch sensing signal by mixing the amplified touch sensing signal with the demodulating signal includes: mixing the amplified touch sensing signal and the demodulating signal to generate the demodulated touch sensing signal; reducing noise of the demodulated touch sensing signal; and amplifying the demodulated touch sensing signal that the noise is reduced.

In an exemplary embodiment of the invention, the step of demodulating the amplified touch sensing signal by mixing the amplified touch sensing signal with the demodulating signal further includes: converting the touch sensing signal of an analog format to the touch sensing signal of a digital format before or after the step of mixing the amplified touch sensing signal and the demodulating signal to generate the demodulated touch sensing signal.

According to the above descriptions, in the exemplary embodiments of the invention, the operational amplifier circuit compensates the received touch sensing signal via a direct-current voltage, and the demodulating circuit demodulates the amplified touch sensing signal with a demodulating signal that the waveform includes a flat region, such that circuit structure is simplified and circuit performance is enhanced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

The term "coupling/coupled" used in this specification (including claims) of the disclosure may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 1:
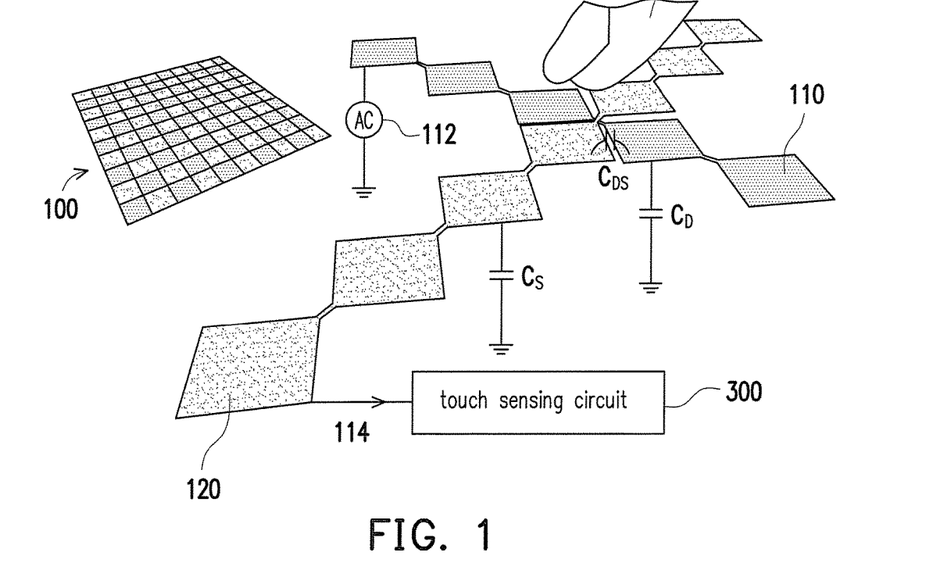
FIG. 1 and FIG. 2 respectively illustrate a capacitive touch sensing scheme and an equivalent circuit thereof according to an embodiment of the invention.
Figure 2:
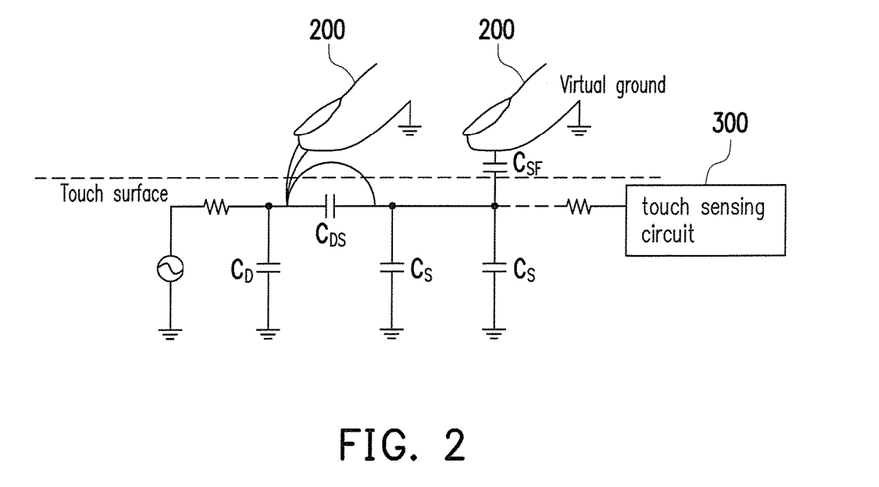

FIG. 1 and FIG. 2 respectively illustrate a capacitive touch sensing scheme and an equivalent circuit thereof according to an embodiment of the invention. Referring to FIG. 1 and FIG. 2, a capacitive touch panel 100 of the present embodiment includes a plurality of touch electrodes arranged in an array. The touch electrodes are categorized into scanning electrodes 110 and sensing electrodes 120. A touch controller/driver may output driving signals 112 to the scanning electrodes 110, so as to drive the sensing electrodes 120 to sense a gesture 200. The gesture 200 performs on the capacitive touch panel 100 and changes surface capacitances of the areas between the scanning electrodes 110 and the sensing electrodes 120 that the gesture 200 touches. The sensing electrodes 120 senses capacitance variations thereof, and transmits touch sensing signals 114 to a touch sensing circuit 300. The information related to the gesture 200 are carried on the touch sensing signals 114. In an embodiment of the invention, the touch sensing circuit 300 may include a plurality of touch sensing channels to process the touch sensing signals 114 transmitted from the sensing electrodes 120 of different rows or columns.

Figure 3:
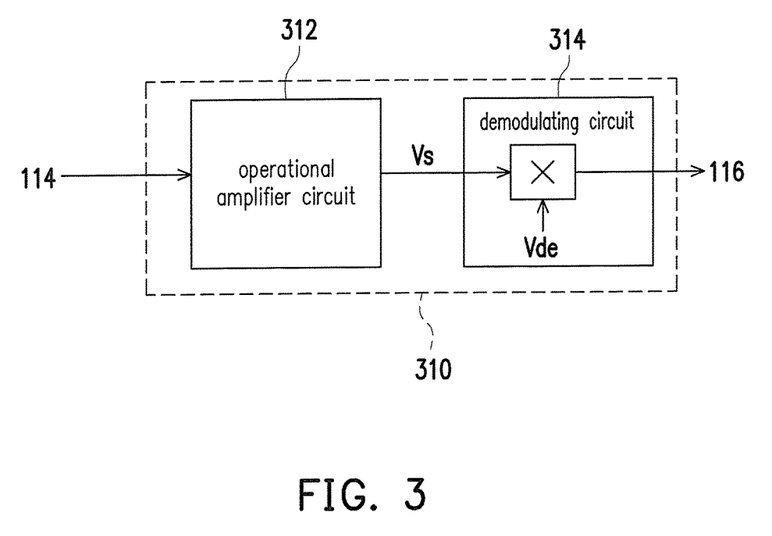
FIG. 3 illustrates a schematic block diagram of a touch sensing channel according to an embodiment of the invention.

FIG. 3 illustrates a schematic block diagram of a touch sensing channel according to an embodiment of the invention. Referring to FIG. 3, the touch sensing channel 310 of the present embodiment may serve as an analog front-end (AFE) circuit for processing the received touch sensing signal 114, and further output the processed touch sensing signal 116 to a circuit of the next-stage. In an embodiment of the invention, the touch sensing channel 310 may include a set of analog signal conditioning circuitry that uses operational amplifiers, filters, and sometimes application-specific integrated circuits for sensors and other circuits to provide a configurable and flexible electronics functional block, needed to interface a variety of sensors to an analog-to-digital converter or in some cases to a microcontroller.

In the present embodiment, the touch sensing channel 310 includes an operational amplifier circuit 312 and a demodulating circuit 314. The operational amplifier circuit 312 receives and amplifies the touch sensing signal 114, and outputs the amplified touch sensing signal Vs to the demodulating circuit 314. The demodulating circuit 314 is coupled to the operational amplifier circuit 312. The demodulating circuit 314 demodulates the amplified touch sensing signal Vs by mixing the amplified touch sensing signal Vs with a demodulating signal Vde. In the present embodiment, a waveform of the demodulating signal Vde includes a flat region. In a preferable embodiment, the demodulating signal Vde may be a square wave, but the invention is not limited thereto. Any signal that a waveform includes a flat region may be adopted for the demodulating signal.

Figure 4:
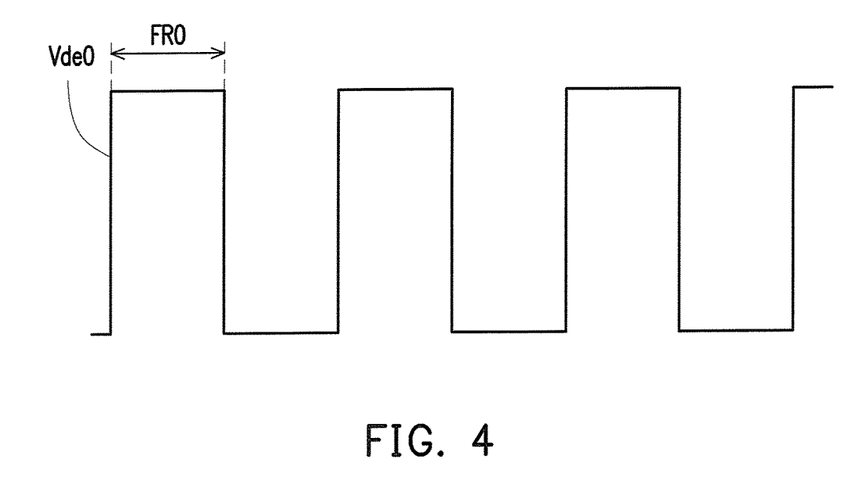
FIG. 4 to FIG. 8 respectively illustrate schematic waveforms of demodulating signals according to a plurality of embodiments of the invention.
Figure 5:
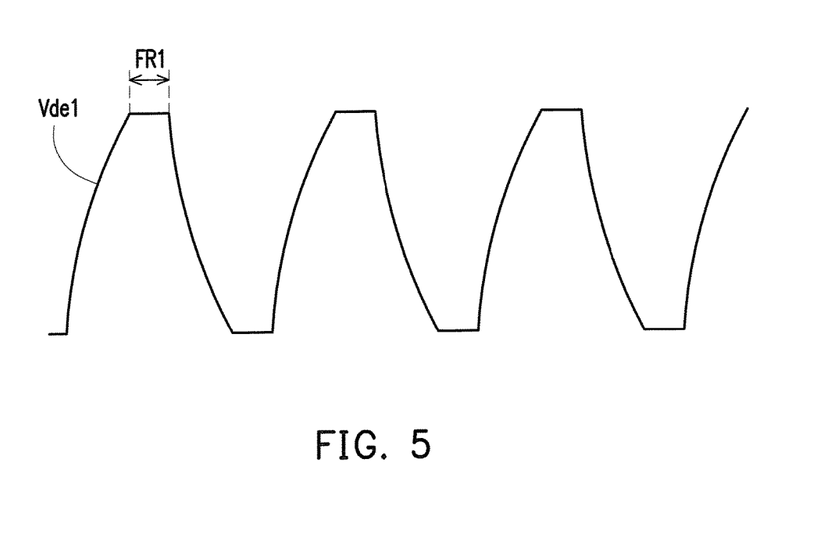
Figure 6:
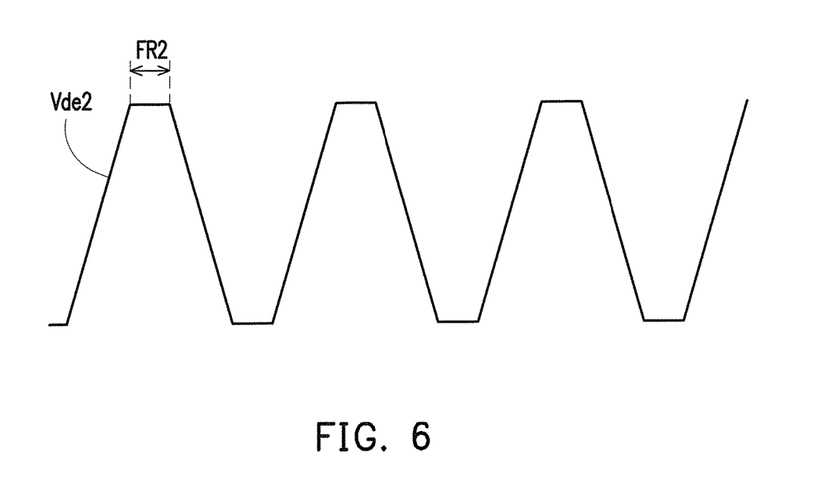
Figure 7:
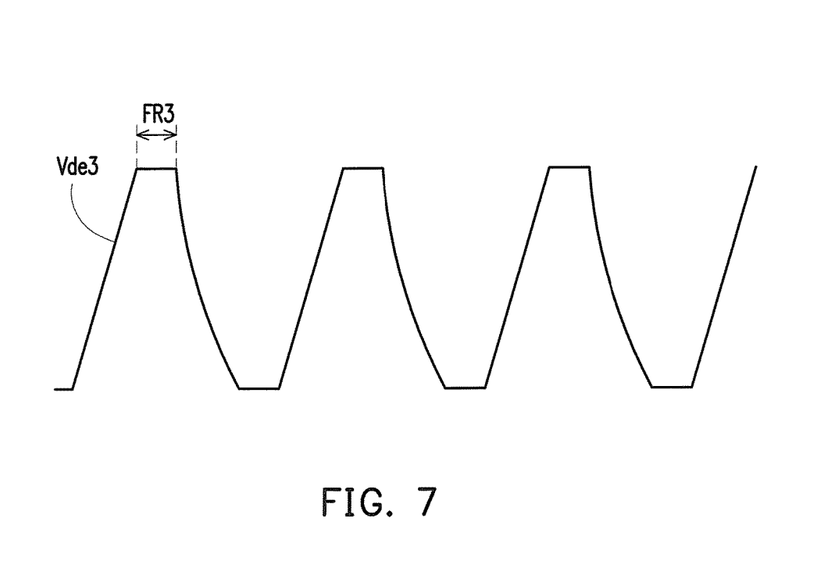
Figure 8:
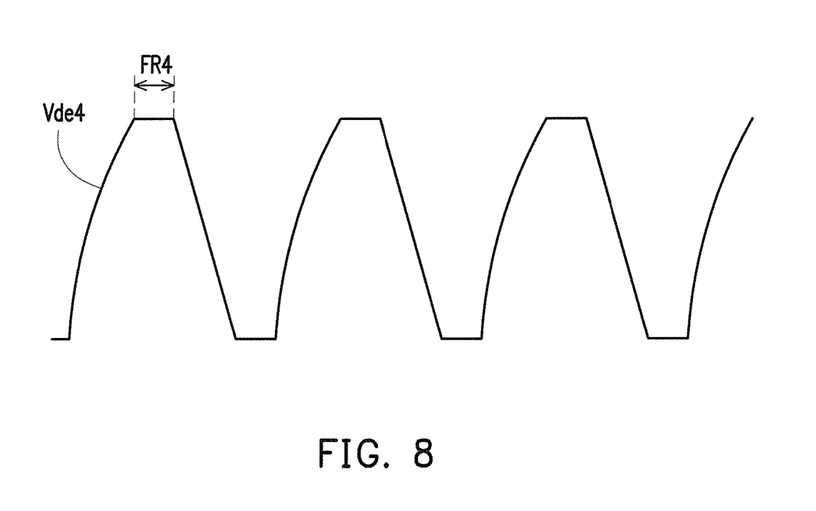

FIG. 4 to FIG. 8 respectively illustrate schematic waveform is of demodulating signals according to a plurality of embodiments of the invention. Referring to FIG. 4 to FIG. 8, each of the demodulating signals includes a flat region in the exemplary embodiments. For example, the demodulating signal Vde0 illustrated in FIG. 4 is a square wave having a relatively wide flat region FR0. The demodulating signal Vde1 illustrated in FIG. 5 includes a flat region FR1, and has two edges that slopes gradually change. The demodulating signal Vde2 illustrated in FIG. 6 includes a flat region FR2, and has two edges with constant slopes. The demodulating signal Vde3 illustrated in FIG. 7 includes a flat region FR3, and has a left edge with a constant slope and a right edge that the slope gradually changes. The demodulating signal Vde4 illustrated in FIG. 8 includes a flat region FR4, and has a left edge that the slope gradually changes and a right edge with a constant slope. However, the foregoing waveforms are not intended to limit the invention but may be adjusted according to the design.

Figure 9:
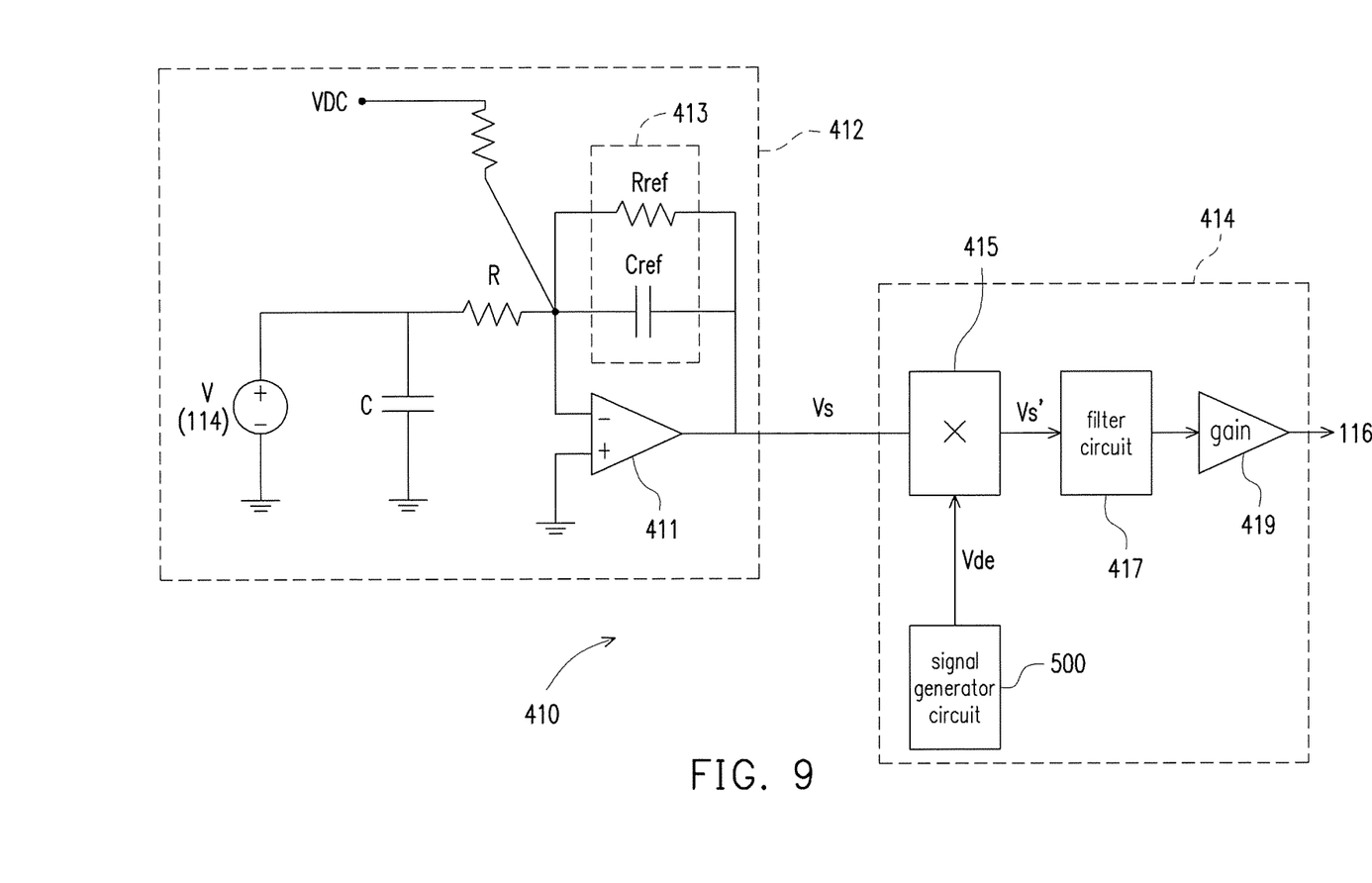
FIG. 9 illustrates a schematic circuit diagram of a touch sensing channel according to an embodiment of the invention.

FIG. 9 illustrates a schematic circuit diagram of a touch sensing channel according to an embodiment of the invention. Referring to FIG. 9, the operational amplifier circuit 412 of the present embodiment includes an operational amplifier 411 and an impedance device 413. The operational amplifier 411 has an inverting end, a non-inverting end, and an output end. The inverting end is coupled to a direct-current voltage VDC. The non-inverting end is coupled to a ground voltage. The impedance device 413 is coupled between the inverting end and the output end. In the present embodiment, the inverting end is coupled to the direct-current voltage VDC for signal compensation, and thus a compensation capacitor is unnecessary. The circuit structure of the operational amplifier circuit 412 is further simplified.

In the present embodiment, the operational amplifier circuit 412 amplifies the touch sensing signal 114, and outputs the amplified touch sensing signal Vs to the demodulating circuit 414. In the present embodiment, the demodulating circuit 414 includes a mixer circuit 415, a filter circuit 417 and a gain amplifier circuit 419. The mixer circuit 415 is coupled to the operational amplifier circuit 412. The mixer circuit 415 receives and mixes the amplified touch sensing signal Vs and the demodulating signal Vde to generate the demodulated touch sensing signal Vs'. The filter circuit 417 is coupled to the mixer circuit 415. The filter circuit 417 receives the demodulated touch sensing signal Vs', and reduces noise of the demodulated touch sensing signal Vs'. The gain amplifier circuit 419 is coupled to the filter circuit 417. The gain amplifier circuit 419 receives and amplifies the demodulated touch sensing signal Vs' that the noise is reduced. The gain amplifier circuit 419 outputs the processed touch sensing signal 116 to the circuit of the next-stage.

In the present embodiment, the demodulating signal Vde is generated via a signal generator circuit 500. The signal generator circuit 500 may be embedded inside the demodulating circuit 414 or arranged outside of the demodulating circuit 414. The invention is not limited thereto. In addition, the demodulating signal Vde of the present embodiment may be a square wave, and the waveform thereof includes a flat region. Therefore, the mixer circuit 415 for mixing the amplified touch sensing signal Vs and the demodulating signal Vde may include a low-bit multiplier for signal demodulation.

In the present embodiment, the mixer circuit 415, the filter circuit 417, the gain amplifier circuit 419 and the signal generator circuit 500 may be implemented by using any adaptive mixer circuit, filter circuit, gain amplifier circuit and signal generator circuit in the related art, which are not particularly limited by the invention. Therefore, enough teaching, suggestion, and implementation illustration for internal circuit structures and implementations of the mixer circuit 415, the filter circuit 417, the gain amplifier circuit 419 and the signal generator circuit 500 may be obtained with reference to common knowledge in the related art, which are not repeated hereinafter.

Figure 10:
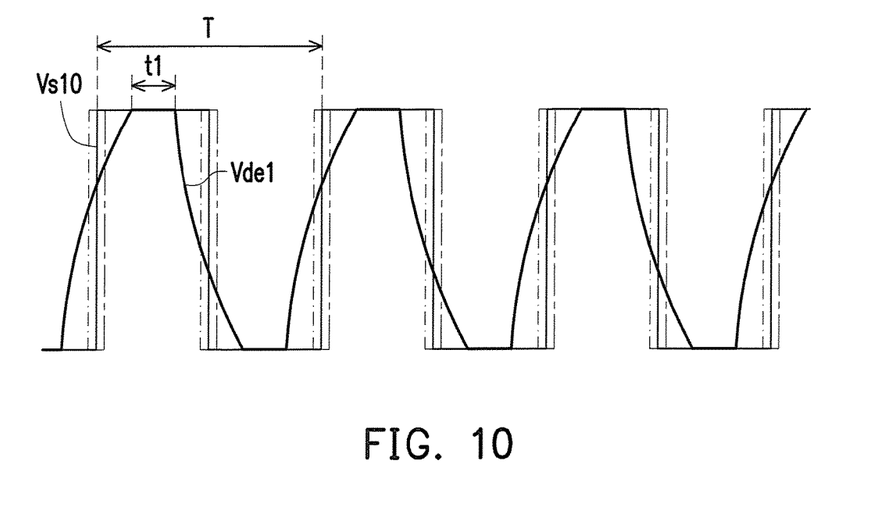
FIG. 10 to FIG. 11 respectively illustrate schematic diagrams of signal demodulation according to a plurality of embodiments of the invention.
Figure 11:
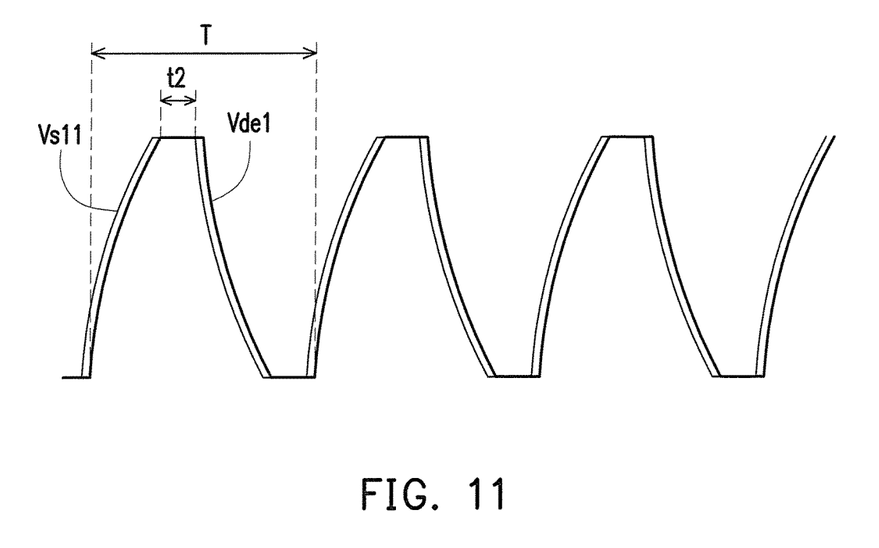

FIG. 10 to FIG. 11 respectively illustrate schematic diagrams of signal demodulation according to a plurality of embodiments of the invention. Referring to FIG. 10 to FIG. 11, the amplified touch sensing signal Vs may be a periodical signal Vs10 or Vs11 having a period T in the exemplary embodiments. In the present embodiment, by using the demodulating signal Vde1, the demodulating circuit 414 demodulates the amplified touch sensing signal Vs10 or Vs11 to extract a carrier signal that includes the information related to the gesture 200 from the amplified touch sensing signal Vs10 or Vs11 during a part time interval t1 or t2 of the period T. Taking the signal demodulation illustrated in FIG. 10 for example, the part time interval t1 that the carrier signal is extracted substantially locates in a middle region of the high level, and thus the issue of time jitter is reduced in the present embodiment. Demodulating the amplified touch sensing signal Vs10 or Vs11 by using other demodulating signals Vde0 and Vde2 to Vde4 may be deduced by analogy, and it is not further described herein.

Figure 12:
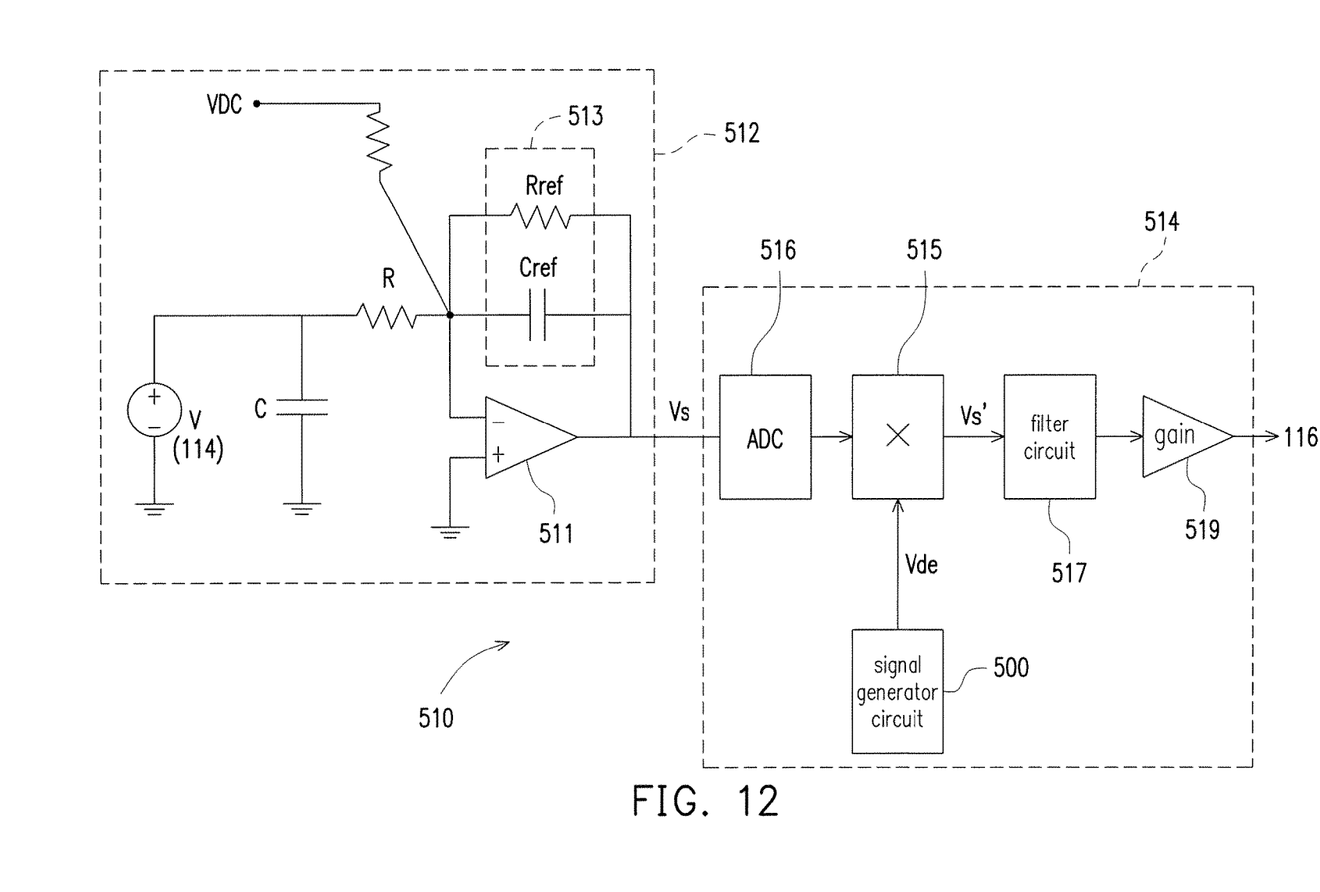
FIG. 12 illustrates a schematic circuit diagram of a touch sensing channel according to another embodiment of the invention.

FIG. 12 illustrates a schematic circuit diagram of a touch sensing channel according to another embodiment of the invention. Referring to FIG. 12, the touch sensing channel 510 of the present embodiment is similar to the touch sensing channel 410 illustrated in FIG. 9, and the main difference therebetween, for example, lies in that the demodulating circuit 514 further includes an analog-to-digital converter circuit 516. The analog-to-digital converter circuit 516 is located before the mixer circuit 515, and connected between the operational amplifier 511 and the mixer circuit 515. The analog-to-digital converter circuit 516 converts the touch sensing signal Vs of an analog format to the touch sensing signal Vs of a digital format. In another embodiment of the invention, the analog-to-digital converter circuit may also be located after the mixer circuit.

Figure 13:
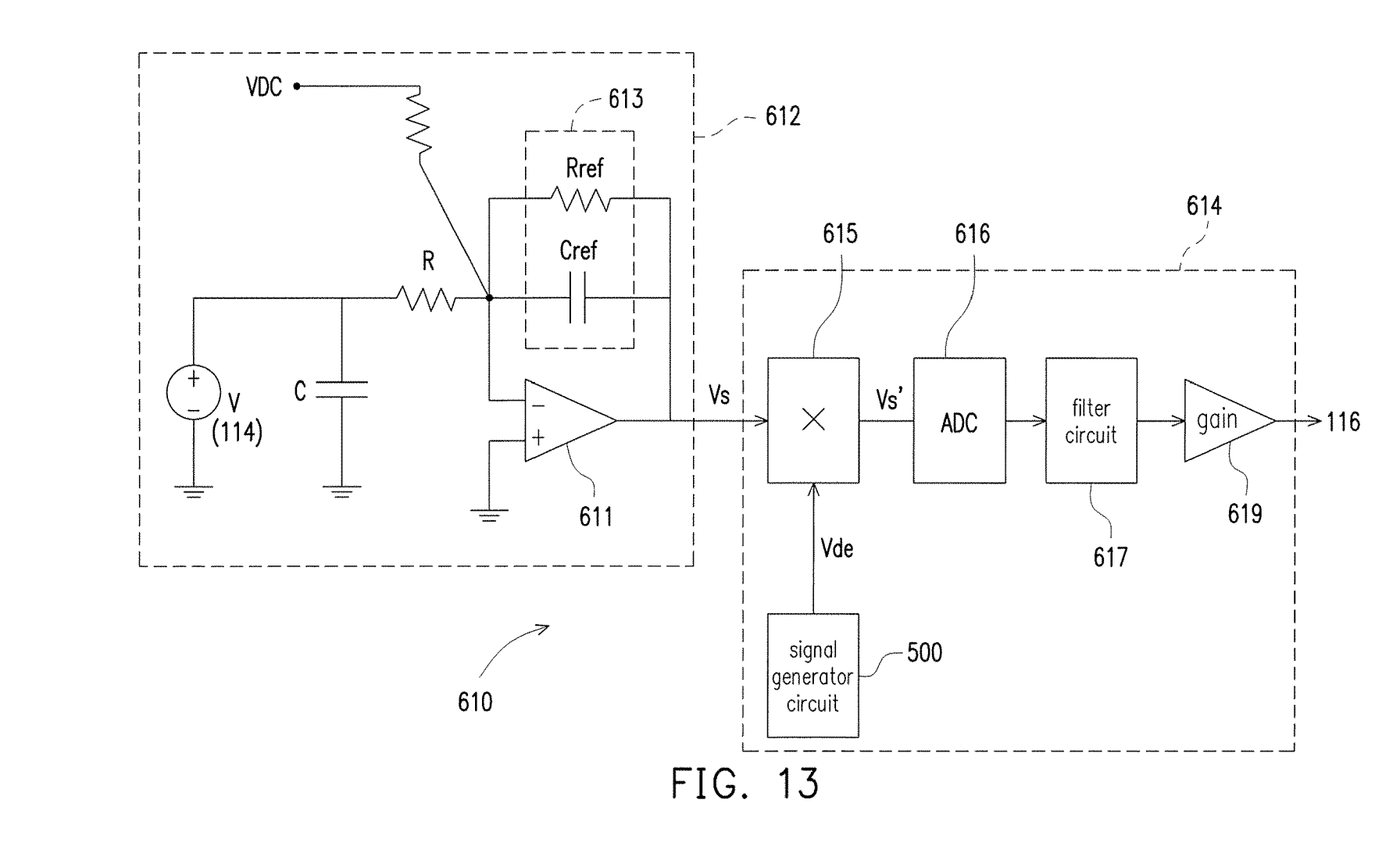
FIG. 13 illustrates a schematic circuit diagram of a touch sensing channel according to another embodiment of the invention.

FIG. 13 illustrates a schematic circuit diagram of a touch sensing channel according to another embodiment of the invention. Referring to FIG. 13, the touch sensing channel 610 of the present embodiment is similar to the touch sensing channel 410 illustrated in FIG. 9, and the main difference therebetween, for example, lies in that the demodulating circuit 614 further includes an analog-to-digital converter circuit 616. The analog-to-digital converter circuit 616 is located after the mixer circuit 615, and connected between the mixer circuit 615 and the filter circuit 617. The analog-to-digital converter circuit 616 converts the demodulated touch sensing signal Vs' of an analog format to the demodulated touch sensing signal Vs' of a digital format.

Figure 14:
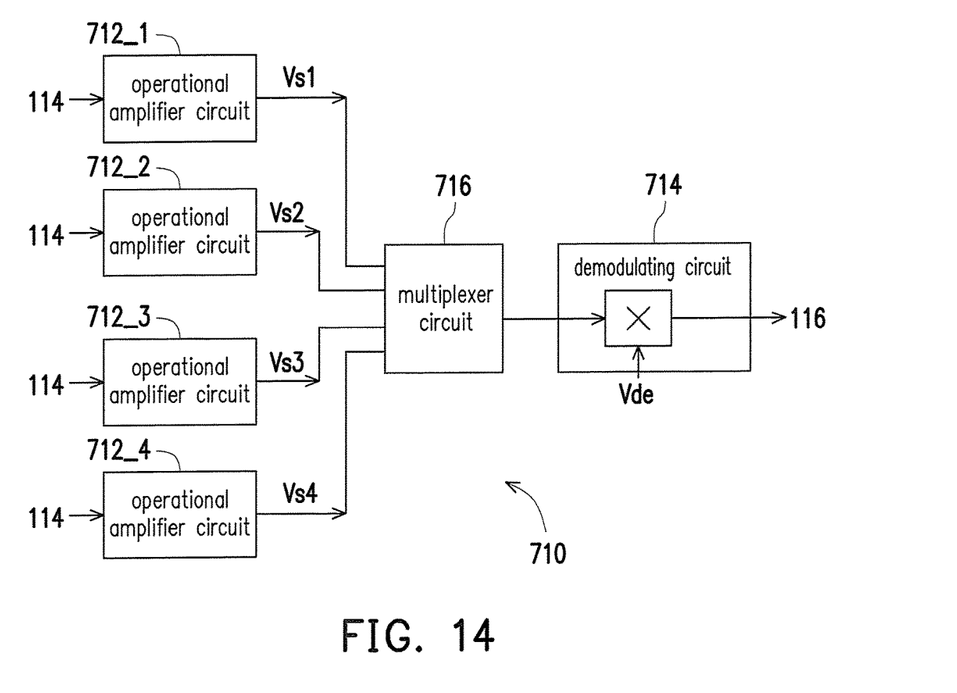
FIG. 14 illustrates a schematic block diagram of a touch sensing channel according to another embodiment of the invention.

FIG. 14 illustrates a schematic block diagram of a touch sensing channel according to another embodiment of the invention. Referring to FIG. 14, the touch sensing channel 710 of the present embodiment is similar to the touch sensing channel 310 illustrated in FIG. 3, and the main difference therebetween, for example, lies in that the touch sensing channel 710 includes a plurality of operational amplifier circuits 712_1 to 712_4 and further includes a multiplexer circuit 716.

In the present embodiment, the multiplexer circuit 716 is coupled between the operational amplifier circuits 712_1 to 712_4 and the demodulating circuit 714. The multiplexer circuit 714 sequentially selects one of the operational amplifier circuits 712_1 to 712_4, and pass the amplified touch sensing signal Vs1, Vs2, Vs3 or Vs4 to the demodulating circuit 714 for signal demodulation. In the present embodiment, the touch sensing channel 710 demodulates the amplified touch sensing signals Vs1 to Vs4 in a manner of time-division multiplexing (TDM). The multiplexer circuit 714 may sequentially or randomly demodulate the amplified touch sensing signals Vs1 to Vs4 to output the processed touch sensing signal.

For example, the multiplexer circuit 714 may select the operational amplifier circuit 712_1. The operational amplifier circuits 712_2 to 712_4 are disabled. The operational amplifier circuit 712_1 transmits the amplified touch sensing signal Vs1 to the multiplexer circuit 714, and the multiplexer circuit 714 passes the amplified touch sensing signal Vs1 to the demodulating circuit 714 for signal demodulation. In the meanwhile, the operational amplifier circuits 712_2 to 712_4 may be disable to stop working, and thus the operational amplifier circuits 712_2 to 712_4 do not transmit the amplified touch sensing signals Vs2 to Vs4 to the multiplexer circuit 714. Next, the multiplexer circuit 714 may select the operational amplifier circuit 712_2. The operational amplifier circuits 712_1, 712_3 and 712_4 are disabled. The operational amplifier circuit 712_2 transmits the amplified touch sensing signal Vs2 to the multiplexer circuit 714, and the multiplexer circuit 714 passes the amplified touch sensing signal Vs2 to the demodulating circuit 714 for signal demodulation. The operation of the operational amplifier circuits 712_3 and 712_4 can be deduced by analogy, and it is not further described herein.

In the present embodiment, if one of the operational amplifier circuits 712_1 to 712_4 is enabled, the other operational amplifier circuits are disabled. By adopting the manner of time-division multiplexing for signal demodulation, the filter circuit of the demodulating circuit 714 is further simplified. For example, a ROM table thereof is relatively small.

In the present embodiment, the operational amplifier circuits 712_1 to 712_4, the multiplexer circuit 716, and the demodulating circuit 714 may be implemented by using any adaptive operational amplifier circuit, multiplexer circuit, and demodulating circuit in the related art, which are not particularly limited by the invention. In one embodiment, the operational amplifier circuits 712_1 to 712_4 and the demodulating circuit 714 may be implemented by using the operational amplifier circuit and the demodulating circuit illustrated in FIG. 9, FIG. 12 or FIG. 13. Therefore, enough teaching, suggestion, and implementation illustration for internal circuit structures and implementations of the operational amplifier circuits 712_1 to 712_4, the multiplexer circuit 716, and the demodulating circuit 714 may be obtained with reference to common knowledge in the related art, which are not repeated hereinafter.

Figure 15:
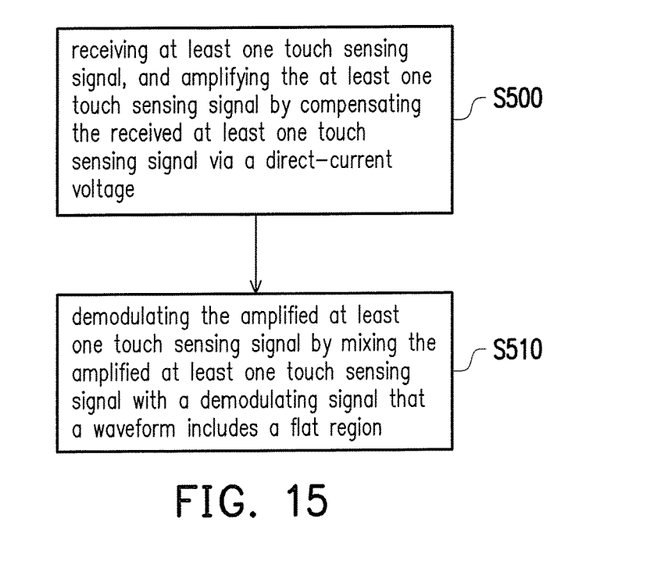
FIG. 15 is a flowchart illustrating steps of a signal demodulating method in an embodiment of the invention.

FIG. 15 is a flowchart illustrating steps of a signal demodulating method in an embodiment of the invention. Referring to FIG. 9 and FIG. 15, the signal demodulating method is at least adapted to the touch sensing channel 410 in FIG. 9, but the invention is not limited thereto. The signal demodulating method at least includes the following steps. In step S500, the touch sensing channel 410 receives the touch sensing signal 114, and amplifies the touch sensing signal 114 by compensating the received the touch sensing signal 114 via the direct-current voltage VDS. In step S510, the touch sensing channel 410 demodulates the amplified touch sensing signal Vs by mixing the amplified touch sensing signal Vs' with the demodulating signal Vde that the waveform includes a flat region, so as to output the processed touch sensing signal 116.

Besides, the signal demodulating method described in the present embodiment of the invention is sufficiently taught, suggested, and embodied in the embodiments illustrated in FIG. 1 to FIG. 14, and therefore no further description is provided herein.

In summary, in the exemplary embodiments of the invention, the operational amplifier circuit compensates the received touch sensing signal via a direct-current voltage, and thus a compensation capacitor is unnecessary. The circuit structure of the operational amplifier circuit is further simplified. The demodulating circuit demodulates the amplified touch sensing signal with a demodulating signal that the waveform includes a flat region by a low-bit multiplier. Accordingly, the circuit performance is enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch sensing circuit, comprising:
   a plurality of touch sensing channels, each comprising:
   at least one operational amplifier circuit, configured to receive a touch sensing signal, and amplify the touch sensing signal, wherein the at least one operational amplifier circuit comprises an operational amplifier having an inverting end, and the inverting end is configured to receive the touch sensing signal and a direct-current voltage and to compensate the received touch sensing signal by the direct-current voltage; and
   a demodulating circuit, coupled to the at least one operational amplifier circuit, and configured to demodulate the amplified touch sensing signal by mixing the amplified touch sensing signal with a demodulating signal, wherein a waveform of the demodulating signal comprises a flat region.

2. The touch sensing circuit according to claim 1, wherein the at least one operational amplifier circuit comprises a plurality of operational amplifier circuits, and each of the touch sensing channels comprises:
   a multiplexer circuit, coupled between the operational amplifier circuits and the demodulating circuit, and configured to sequentially select one of the operational amplifier circuits, and pass the amplified touch sensing signal to the demodulating circuit.

3. The touch sensing circuit according to claim 2, wherein the unselected operational amplifier circuits are disabled to stop working.

4. The touch sensing circuit according to claim 1, wherein the amplified touch sensing signal is a periodical signal having a period, and the demodulating circuit demodulates the amplified touch sensing signal to extract a carrier signal from the amplified touch sensing signal during a part time interval of the period.

5. The touch sensing circuit according to claim 1, wherein an operational amplifier further has a non-inverting end and an output end, and the non-inverting end is coupled to a ground voltage, and the at least one operational amplifier circuit further comprises an impedance device coupled between the inverting end and the output end.

6. The touch sensing circuit according to claim 1, wherein the demodulating circuit comprises:
   a mixer circuit, coupled to at least one operational amplifier circuit, configured to receive and mix the amplified touch sensing signal and the demodulating signal to generate the demodulated touch sensing signal;
   a filter circuit, coupled to the mixer circuit, configured to receive the demodulated touch sensing signal, and reduce noise of the demodulated touch sensing signal; and a gain amplifier circuit, coupled to the filter circuit, configured to receive and amplify the demodulated touch sensing signal that the noise is reduced.

7. The touch sensing circuit according to claim 6, wherein the demodulating circuit further comprises:
an analog-to-digital converter circuit, coupled to the mixer circuit and located before the mixer circuit or after the mixer circuit, and configured to convert the touch sensing signal of an analog format to the touch sensing signal of a digital format.

8. A signal demodulating method, adapted to a touch sensing circuit, comprising:
configuring at least one operational amplifier circuit, wherein the at least one operational amplifier circuit comprises an operational amplifier having an inverting end;
receiving at least one touch sensing signal at the inverting end, and receiving a direct-current voltage to amplify the at least one touch sensing signal by compensating the received at least one touch sensing signal by the direct-current voltage that is received at the inverting end; and
demodulating the amplified at least one touch sensing signal by mixing the amplified at least one touch sensing signal with a demodulating signal, wherein a waveform of the demodulating signal comprises a flat region.

9. The signal demodulating method according to claim 8, wherein at least one touch sensing signal comprises a plurality of touch sensing signals, and the signal demodulating method further comprises:
sequentially selecting one of the amplified touch sensing signals to be demodulated.

10. The signal demodulating method according to claim 8, wherein the amplified at least one touch sensing signal is a periodical signal having a period, and in the step of demodulating the amplified at least one touch sensing signal by mixing the amplified at least one touch sensing signal with the demodulating signal, the amplified at least one touch sensing signal is demodulated to extract a carrier signal from the amplified at least one touch sensing signal during a part time interval of the period.

11. The signal demodulating method according to claim 8, wherein the step of demodulating the amplified at least one touch sensing signal by mixing the amplified at least one touch sensing signal with the demodulating signal comprises:
mixing the amplified at least one touch sensing signal and the demodulating signal to generate the demodulated at least one touch sensing signal;
reducing noise of the demodulated at least one touch sensing signal; and
amplifying the demodulated at least one touch sensing signal that the noise is reduced.

12. The signal demodulating method according to claim 11, wherein the step of demodulating the amplified at least one touch sensing signal by mixing the amplified at least one touch sensing signal with the demodulating signal further comprises:
converting the at least one touch sensing signal of an analog format to the at least one touch sensing signal of a digital format before or after the step of mixing the amplified at least one touch sensing signal and the demodulating signal to generate the demodulated at least one touch sensing signal.

* * * * *